Figure 3:
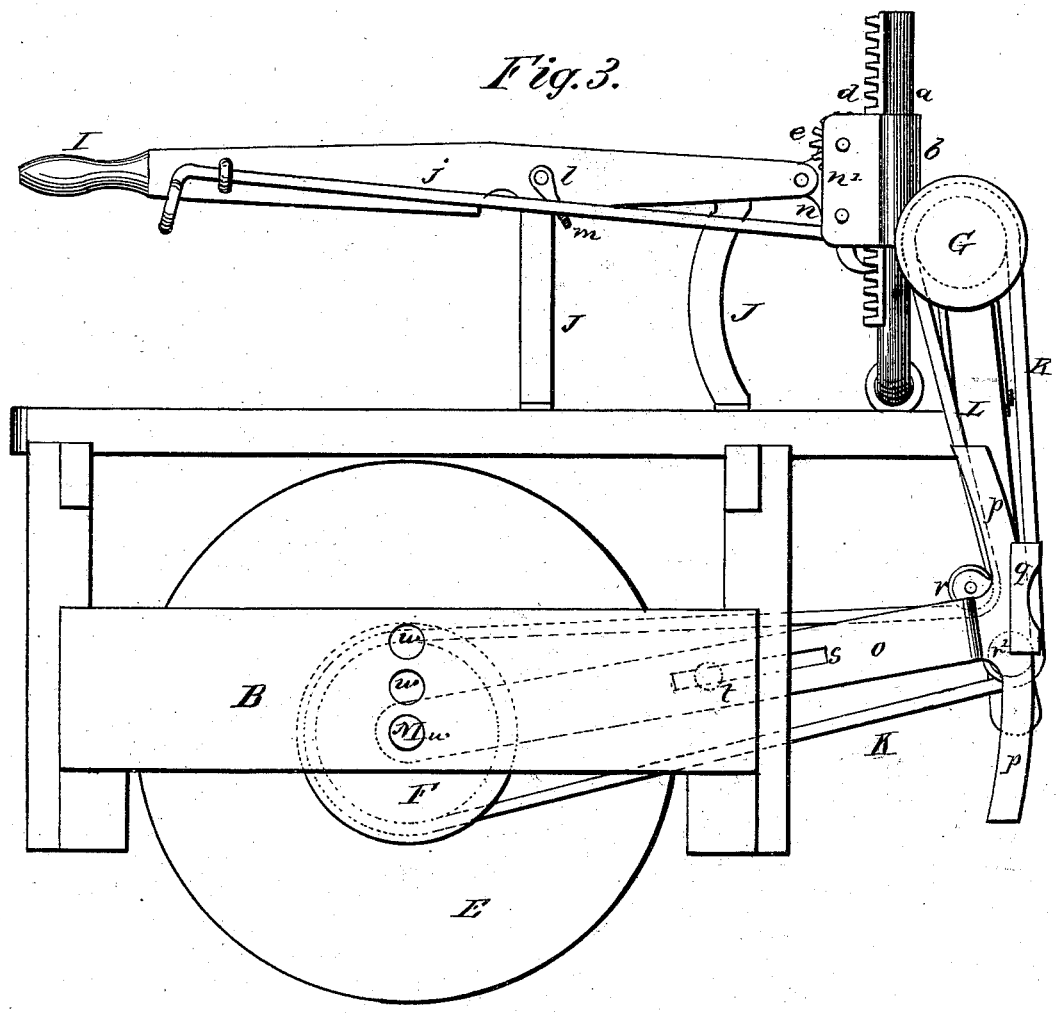

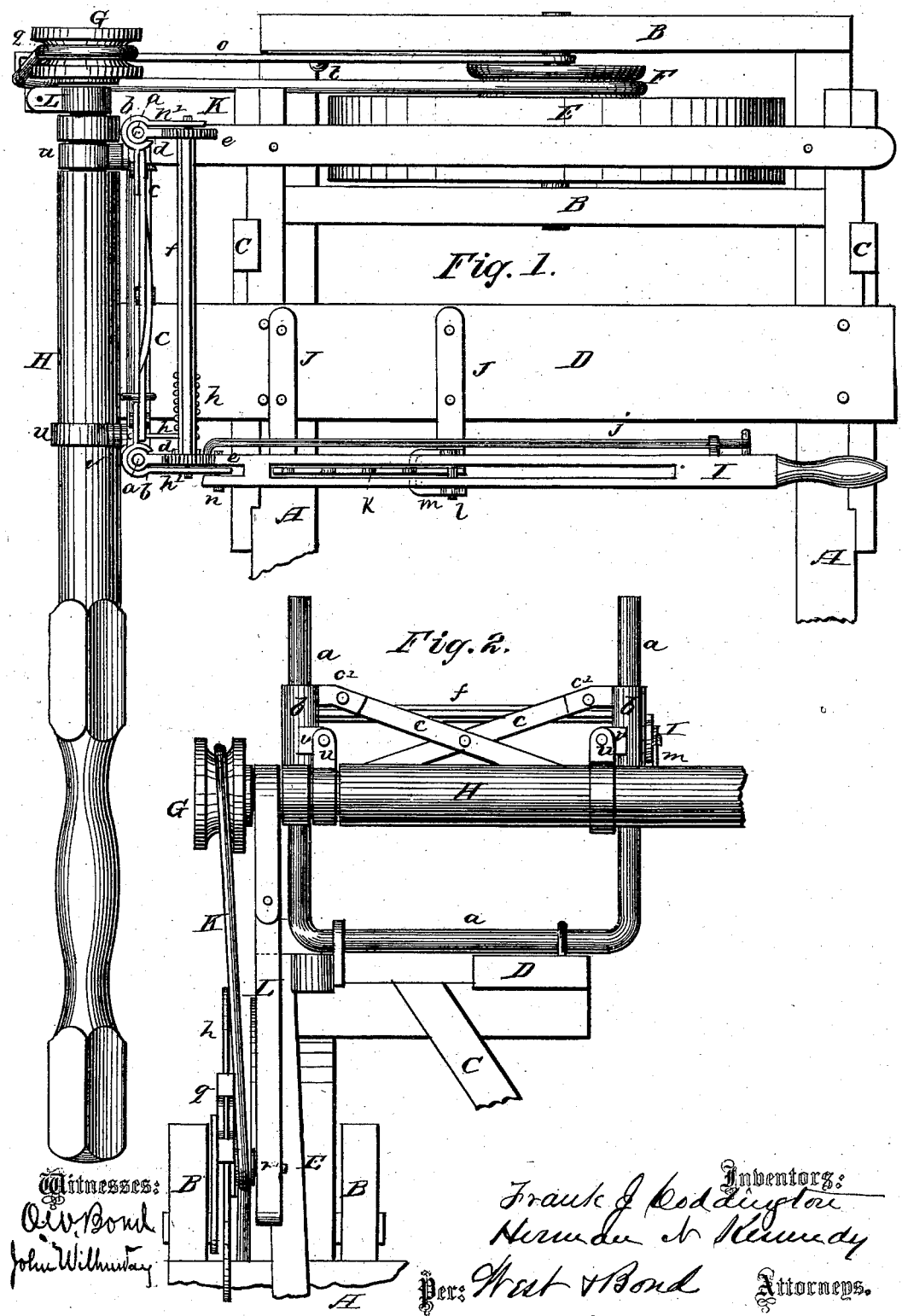

F. J. CODDINGTON & H. N. KENNEDY.
HARVESTER-REEL.

No. 187,749. Patented Feb. 27, 1877.

3 Sheets—Sheet 3.
F. J. CODDINGTON & H. N. KENNEDY.
HARVESTER-REEL.
No. 187,749. Patented Feb. 27, 1877.
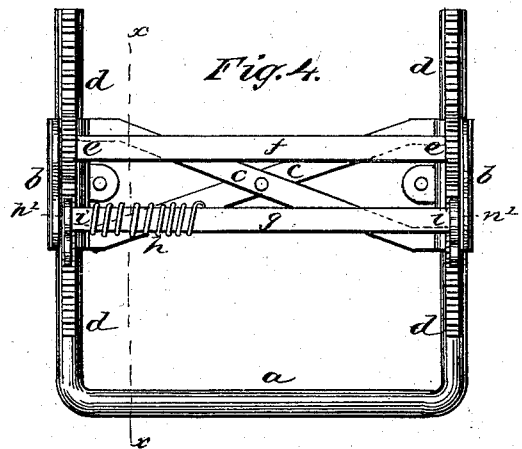
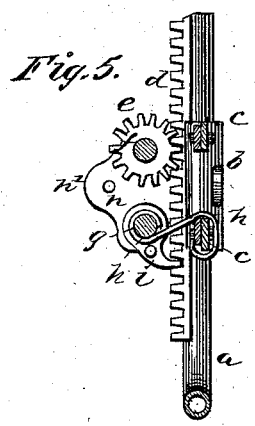
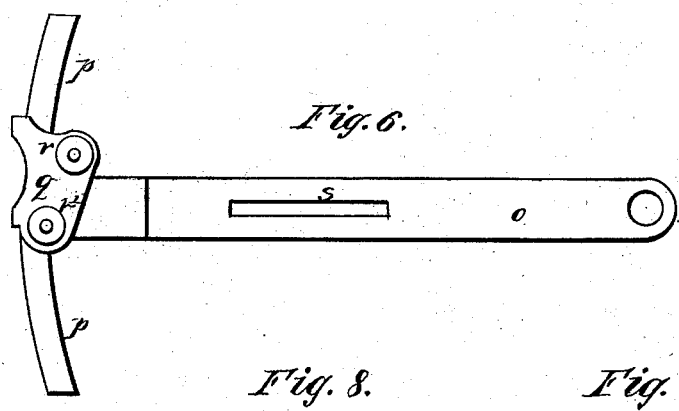
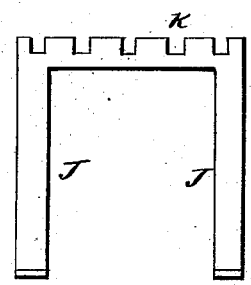
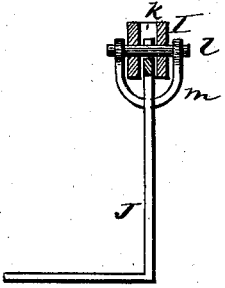

UNITED STATES PATENT OFFICE.

FRANK J. CODDINGTON AND HERMAN N. KENNEDY, OF PLANO, ASSIGNORS TO ELIJAH H. GAMMON AND WILLIAM DEERING, OF CHICAGO, ILLINOIS.

IMPROVEMENT IN HARVESTER-REELS.

Specification forming part of Letters Patent No. 187,749, dated February 27, 1877; application filed January 25, 1876.

*To all whom it may concern:*

Be it known that we, FRANK J. CODDINGTON and HERMAN N. KENNEDY, of Plano, Kendall county, State of Illinois, have invented new and useful Improvements in Reel-Supports for Harvesters, of which the following is a full description, reference being had to the accompanying drawings, in which—

Figure 1 is a top or plan view; Fig. 2, an end view; Fig. 3, a side view; Fig. 4, a rear view of the reel-supporting frame; Fig. 5, a section on line $x\ x$ of Fig. 4; Figs. 6 and 7, details of the belt-tightener or take-up; Fig. 8, a side view of the lever-holder, and Fig. 9 a cross-section of the lever and holder.

The object of this invention is to so attach a reel to a harvester that it may be raised or lowered, and adjusted front and rear readily by the driver, and be permanently held in any position in which it may be placed; and its nature consists in the several improvements and combinations hereinafter set forth and claimed as new.

In the drawings, A represents a portion of the main frame, in which a carrier is located, and in front of which an ordinary sickle is operated; B, the frame-work within which the drive-wheel is arranged; C, the frame-work of an elevator, (not shown, but which may be of any ordinary construction;) D, the cross-bar to which the drivers' seat is usually attached; E, the main or drive wheel; F G, the belt or chain pulleys or wheels; H, the reel-shaft; I, the hand-lever; J, the locking device or frame for the hand-lever; K, the belt or chain; L, the bar depending from the reel-shaft; M, the axle of the drive-wheel; $a$, the frame for supporting the reel; $b$, the journal-supports sliding upon the frame $a$; $c$, the cross-bars to prevent binding, and to hold the journal-supports in the same relative position to each other; $d$, the racks on the arms of the frame $a$; $e$, the pinions engaging with the racks $d$; $f$, the shaft of the pinions $e$; $g$, the pawl-shaft; $h$, the spring; $i$, the pawls on the pawl-shaft; $j$, the rod for operating the pawls $i$; $k$, the notches in the frame J for holding the hand-lever; $l$, the pin on the hand-lever for engaging with the notches $k$, and which also furnish a support for the link $m$, which prevents the hand-lever from being lifted too far out of position; $m$, the link for keeping the lever I in position; $n$, the pivot of the hand-lever I; $o$, the belt-tightener or take-up; $p$, the curved head; $q$, the sliding plate; $r\ r'$, the anti-friction pulleys on the plate $o$; $s$, the slot in the arm or lever $o$; $t$, the pivot of the arm or lever $o$; $u$, the journal-bearings of the reel-shaft, connected with the slides $b$ by brackets or projections $v$; $w$, the holes or journal-bearings in the frame B for raising or lowering the drive or main wheel E.

In construction, the frame A B C is made in any of the usual or well-known forms of machines which are provided with grain-carriers and elevators, and the drive-wheel E is provided with the necessary gearing to operate a sickle-carrier and elevator. There is also attached to its axle M a pulley or chain wheel, F, for driving the reel. At the front of the elevator the reel-supporting frame $a$ is attached at about the plane of the cross-bar D. It is made of metal tubing or metal bars, bent in the form shown in Figs. 2 and 4. This frame $a$ is provided with racks $d$, which may be of cast-iron, and inserted within a cut made in the metal tubing, or may be otherwise suitably attached when the frame $a$ is made solid. The portion in cross-section of these arms or frame $a$ not occupied by the racks $d$ is encircled by the journal-supports $b$, which are made to fit closely, as shown. These journal-supports $b$ are connected together by the cross-bar or braces $c$, so as to make them move uniformly together, and prevent unnecessary strain upon the arms of the frame $a$. These journal-supports $b$ have a side or rear projection, $n'$, to one of which the hand-lever I is pivoted at $n$, and into which the shafts $f$ and $g$ are journaled. The shaft $f$ is provided with pinions $e$, corresponding to the racks $d$, and as the journal-supports $b$ are moved up and down one pinion forces the other so as to give each journal-support $b$ a uniform movement, and thereby keep the reel level in operation. The shaft $g$ is also journaled in these rear projections $n'$, and is provided at each end with the pawls $i$, which are kept engaged with the racks $d$ by means of the spring $h$ on the shaft $g$. Whenever the reel is to be moved up or down these pawls *i* are withdrawn by means of the rod *j*, which extends backward on the hand-lever I, so as to be within convenient reach of the driver, who, when operating the lever I, pulls the pawls *i* out of their engagement, and by depressing the lever I at the handle the reel will be raised, and by simply withdrawing the pawls *i* the weight of the reel will lower it. If not, it can be forced in the opposite direction by means of the hand-lever I and the link *m*. The reel is held in its front or rear adjustments by means of the engagement of the pin *l* with the notches *k* of the frame J. In order to effect these adjustments, all that is required is to lift the lever I, so as to disengage the pin *l* from its notch *k*, and slide it backward or forward into such other notch *k* as will give the required position.

The hand-lever I is slotted, as shown at Figs. 1 and 9, so as to permit the frame J to pass into it for making the necessary adjustments, and for locking the reel up for traveling the lever I may be drawn so far back as to have the pin *l* fall behind the pin J, when it will be permanently held.

As shown, the journal-bearings *u* are attached to the supports *b* by means of side brackets *v*; but these journal-bearings may be attached directly, if desired, by casting or otherwise forming proper bearings directly upon the supports *b*. By this arrangement the reel may be adjusted to any desired position as to height or pitch, and the reel will be uniformly driven by its driving belt or chain, and at the same time maintain its proper horizontal position without any injurious vibrations.

The belt-tightener or take-up device, consisting of the pendent rod L, bar or lever *o*, curved head *p*, sliding plate *q*, and anti-friction pulleys *r r'*, is described and claimed in a separate application by another applicant, John F. Steward, and need not be herein fully described.

What we claim as new, and desire to secure by Letters Patent, is—

The rigid frame *a*, hinged as described, whereby the sides of the frame are held in parallel lines, in combination with trusses *c*, sliding journal-supports *b*, and operating mechanism, substantially as and for the purpose set forth.

FRANK J. CODDINGTON.
HERMAN N. KENNEDY.

Witnesses:
EDGAR L. HENNING,
FRANK LULL.